United States Patent
Martinez (10) Patent No.: US 6,871,013 B2
(45) Date of Patent: Mar. 22, 2005

(54) HEAT NOZZLE FOR WELDING FLOOR SEAMS

(76) Inventor: Leo Martinez, 6381 Western Ave., Buena Park, CA (US) 90621-2832

( * ) Notice: Subject to any disclaimer, the term of this patent is extended or adjusted under 35 U.S.C. 154(b) by 101 days.

(21) Appl. No.: 10/300,949

(22) Filed: Nov. 20, 2002

(65) Prior Publication Data

US 2004/0094576 A1 May 20, 2004

(51) Int. Cl.[7] ............................................. F24H 3/04
(52) U.S. Cl. .................... 392/379; 392/382; 156/575
(58) Field of Search ........................ 392/379, 382, 392/383, 384, 385; 222/146.5, 478; 156/306.6, 574, 304.6, 575, 578

(56) References Cited

U.S. PATENT DOCUMENTS

| | | | | |
|---|---|---|---|---|
| 1,951,269 A | * | 3/1934 | Boeckx et al. | 392/385 |
| 2,862,543 A | | 12/1958 | Kaminsky | |
| RE24,801 E | * | 3/1960 | Kaminsky | 156/304.5 |
| 3,126,306 A | * | 3/1964 | Sherman | 156/304.6 |
| 3,853,669 A | * | 12/1974 | Werstlein | 156/574 |
| 4,259,142 A | * | 3/1981 | Kortepeter | 156/574 |
| 4,642,158 A | * | 2/1987 | Steinel et al. | 156/574 |
| 5,656,126 A | * | 8/1997 | Martinez | 156/574 |
| 6,149,762 A | * | 11/2000 | Kobzan | 156/574 |

FOREIGN PATENT DOCUMENTS

| | | |
|---|---|---|
| DE | 1 898 146 | 8/1964 |
| DE | 1 909 143 | 1/1965 |
| DE | 1 942 722 | 7/1966 |
| DE | G 94 09 920.0 | 9/1994 |
| DE | 297 13 474 U 1 | 11/1997 |
| GB | 818066 | 8/1959 |
| GB | 1 262 422 | 2/1972 |

OTHER PUBLICATIONS

Martinez Enterprises Turbo Heat Welding Tools Catalog; Oct., 1995, pp. 1 & 2.
Sinclair Equipment Co. Catalog; Apr. 2000, p. 4 "Automatic Welders" and p. 5 "Hand Welders".
Sinclair Equipment Co. Promotional Flyer, "Turbo Welding System", circa Apr. 2000.
Columbine International Promotional Flyer, The Turbo Roller Guide, circa 2000.
Janser Catalog No. 103, pp. 36 thru 40, circa 2000.
Leo Martinez Ent. Promotional Flyer; Turbo Welding System: Dec. 2001 (approx).
Drawings and Brochure for Zinser Super Rapid Nozzle dated Jun. 1995.

* cited by examiner

Primary Examiner—Teresa J. Walberg
(74) Attorney, Agent, or Firm—Charles H. Thomas (57) ABSTRACT

A portable, handheld seam welding gun for filling in seams between sheets of linoleum flooring is provided with a unique heat nozzle. The heat nozzle of the invention couples the heating barrel of a conventional floor seam welding gun to a conventional hollow welding tip by receiving the heating air inlet tube of the tip within the confines of a downstream socket formed in the body of the heat nozzle. A larger, upstream socket formed in the body of the heat nozzle fits onto the heating barrel of the handheld, portable welding gun. A plurality of preheating jets are formed on the underside of the body of the heat nozzle to preheat the region of the channel immediately to the rear of the welding tip just before molten sealant flows into that portion of the channel.

18 Claims, 5 Drawing Sheets

HEAT NOZZLE FOR WELDING FLOOR SEAMS

BACKGROUND OF THE INVENTION

1. Field of the Invention

The present invention is a heat nozzle designed for use with a portable, handheld seam sealing welding gun for dispensing a molten sealant to join adjacent sheets of flooring.

2. Description of the Prior Art

In laying flooring that is sold commercially in sheets, such as linoleum flooring, adjacent sheets of flooring are positioned side by side and cut to the desired shape. In the past the flooring sheets have been secured to the floor by adhesive compound. To secure the flooring sheets to the floor, the compound is applied to the floor and the cut sheets of flooring are laid in position, one by one. Once each sheet of flooring is laid, the next adjacent flooring sheet is brought into position and pressed against the floor with the linear edges of adjacent flooring sheets residing in mutual abutment.

One major problem with laying sheets of flooring in this manner is that the adhesive bond between the underside of the flooring sheets and the subfloor therebeneath is sometimes inadequate. Quite often areas of the sheets of the linoleum flooring will tend to separate from the subfloor when the adhesive bond between the subfloor and the flooring sheets deteriorates due to age, movement of the subfloor, or improper installation.

The separation of areas of flooring sheets from the subfloor is particularly pronounced at the interfaces between adjacent sheets of flooring. The edges of adjacent flooring sheets which are supposed to reside in firm, mutual abutment, will sometimes tend to rise slightly from the subfloor. This presents both an unsightly appearance and also leads to a significant deterioration of the floor because of the separation that occurs when the edges of adjacent sheets of flooring rise. When separation between adjacent sheets of flooring occurs in this way, moisture, dirt and debris often find their way into the crack that forms between the flooring sheets, thus leading to further deterioration of the floor.

In the floor installation trade the use of fusible plastics to form a seal between the abutting edges of adjacent sheets of flooring has gained increased popular acceptance. According to this technique the edges of sheets of flooring are not cut perpendicular to the plane of the expanse of the flooring as has historically been the practice. Rather, the edges of the flooring are cut so that adjacent sheets of flooring, when moved into abutting relationship, define an upwardly facing, elongated groove where they meet. That is, the sheets of flooring are cut so that the exposed upper surface covers a slightly smaller area than the concealed undersurface, thus providing adjacent surfaces forming a groove or channel between adjoining sheets of flooring. These adjacent surfaces can be bonded together using a fusible thermoplastic applied from above. The color of the thermoplastic is chosen to match the color of the flooring so as to render the demarcation between adjacent sheets of flooring largely undetectable.

Automated machines have been developed for applying a fusible plastic sealant to seams between adjacent sheets of flooring. Such automated machines roll upon the floor and apply a bead of molten thermoplastic along the seam between adjacent sheets of flooring. The heat required is provided by electrical resistance heating. The molten thermoplastic quickly cools and bonds to the adjoining edges of adjacent sheets of flooring. Once the adjoining edges of sheets of flooring have been sealed in this manner, they will not separate from each other, even in the event that the bond between the undersides of the sheets of flooring and the subfloor deteriorates with time. This prevents a noticeable gap from forming between adjacent sheets of flooring.

While automated seam sealing machines of the type described do create firm, durable sealed seams between adjacent sections of sheet flooring, they are quite large, bulky, heavy, and complicated to operate. Furthermore, they are quite expensive so that their cost is well beyond the resources of the average sheet flooring installer.

Therefore, a much more economical type of machine for creating a seam of fused thermoplastic between adjacent sheets of flooring was developed. Specifically, portable, handheld seam welding guns have been available commercially for quite some time. Such handheld guns are sold at only a fraction of the cost of automated seam welding machines. These are also typically electrically powered and melt a thermoplastic bead by means of resistance heating.

Handheld seam welding guns of this type are typically configured with a generally cylindrical body forming the rear portion of the gun and a heat conducting member projecting forwardly from the body along a longitudinal axis. An adapter having a heat concentration nose, typically formed of a highly conductive metal, such as copper or a copper alloy, is mounted on the heat conducting member and includes a heating tip mounting tube. The heating tip mounting tube projects forwardly along the longitudinal axis of the body and has of a narrow, tubular configuration. This type of adapter is often referred to in the trade as a "pencil tip" adapter. The heating tip mounting tube fits into a hollow heating tip.

A conventional, portable, handheld seam welding gun heating tip includes a hollow cylindrical sleeve that fits onto the heating tip mounting tube and another tubular structure that accommodates an elongated length or stick of thermoplastic that is fed into the interior of the heating tip and melted therein. Conventional, portable handheld seam welding guns of this type are manufactured in Europe by Leister Process Technologies, CH-6060 Sarnen, Switzerland. Other, comparable commercial seam welding guns are also available, such as the Zinser K-5 handheld welder that is available from Zinser Schweisstechnik GmbH, Stuttgarter Strasse 145, 73061 Ebersback/Fils, Stuttgart, Germany.

While conventional, handheld, portable seam welding guns of the type described can produce high-quality seams, the rate at which the seam can be filled with sealant utilizing a portable, handheld welding gun is rather limited. Specifically, using a portable, handheld seam welding gun an experienced flooring installer can fill seams between abutting sheets of linoleum flooring with sealant at the rate of about four feet a minute. In contrast, the expensive, automated seam sealing machines of the type described can be operated to fill seams at the rate of about sixteen feet per minute.

SUMMARY OF THE INVENTION

Conventional, handheld, floor seam welding guns employ an electrical heating element and blower mounted in a casing that forces heated air through a narrow air duct in a heating tip mounting tube, oriented at an angle relative to a heat conducting metal nose cap. A hollow welding tip is mounted externally on the narrow mounting tube that projects from the nose cap of the welding gun.

In a conventional device such as this the volume of hot air that may be forced into the hollow heating tip is rather limited. Consequently, the rate at which the sticks or rods of plastic sealant can be melted and the floor seam heated beneath the melting chamber in the welding tip is limited. However, the present invention overcomes this basic limitation in portable, handheld seam welding guns that has existed for so long.

In one broad aspect the present invention may be considered to be a heat nozzle for a handheld flooring seam sealing device. The heat nozzle of the invention is comprised of an enclosing body having a top side and underside, and defining therewithin an upstream socket and a downstream socket. The upstream socket receives therewithin a heat-conducting barrel of a handheld floor seam welding gun. The downstream socket receives therewithin a heat welding tip. The downstream socket is oriented at an acute angle of between about ten degrees and about thirty degrees from coaxial alignment with the upstream socket. Consequently, the sockets form an obtuse angle in the heat nozzle body. In addition, at least one preheating jet is formed in the body. The preheating jet, or preferably a plurality of preheating jets, lead from the upstream socket to the underside of the body of the heat nozzle.

By providing a downstream socket into which the hot air inlet tube of the welding tip can be inserted, the volume of hot air flow from an otherwise conventional, handheld floor seam welding gun is markedly increased. This is possible since the entire area of the inlet duct defined within the hot air inlet tube of the welding tip can conduct hot air. In contrast, in a conventional welding tip mounting structure which is the narrow"pencil tip" tube projecting from the heat concentration nose occupies a considerable portion of the cross-sectional area of the hot air inlet of heat welding tips that are commercially available. Consequently, there is a constriction in air flow into the hollow welding tip, which limits the rate at which the sealant can be melted and dispensed in molten form to fill a seam between adjacent flooring sheets.

A further feature of the heat nozzle of the invention is the provision of one or more preheating jets in the heat nozzle. Some heat welding tips currently on the market are equipped with a separate duct in communication with the melting chamber within the tip. This duct terminates in an orifice located behind the rear extremity of the dispensing mouth of the tip. As the welding gun is pulled toward the installer, along the seam to be filled, the preheating duct in the welding tip raises the temperature of the flooring at the seam to enhance adhesion of the sealant thereto when the molten sealant is dispensed through the mouth of the welding tip. Such a heat welding tip is described in prior U.S. Pat. No. 5,656,126 and is available as the Turbo welding tip from Martinez Enterprises, located at 6381 Western Avenue, Buena Park, Calif. 90621. However, in conventional practice all preheating in handheld, manually operated tools has been performed through a duct within the heating tip itself.

However, according to the present invention, at least one, and preferably as many as three separate preheating jets are formed in the body of the heat nozzle of the invention. The first of these jets is located beneath and parallel to the downstream socket that receives the hot air conducting tube of the heat welding tip. Since it is positioned in this manner, the first preheating jet directs a stream of hot air into the seam immediately to the rear of the heat welding tip. This advance preheating raises the temperature of the flooring at the seam, thereby reducing the time it takes to melt the sealant and fill the seam.

Even more rapid preheating is achieved by providing second and third heating jets in the heat nozzle of the invention. These second and third heating jets are preferably oriented at an angle of between forty and sixty-six degrees relative to the first heating jet so that they emit jets of hot air that heat the material of the flooring at the seam even in advance of the first preheating jet which directs hot air at the seam just behind the welding tip. As a consequence, the speed at which a flooring seam can be filled with sealant material is greatly increased relative to the speed with which this task can be performed utilizing conventional handheld seam welding guns equipped with "pencil tip" adapters.

As previously indicated, an experienced flooring installer can operate a conventional, handheld flooring seam welding gun to perform a professional seam sealing job at the rate of about four feet per second. However, utilizing the same welding gun and essentially the same welding tip, but employing a heat nozzle according to the invention in place of a "pencil tip" adapter, the rate of seam sealing can be approximately tripled. That is, utilizing the same heat welding gun and welding nozzle, but with the adapter of the invention, an installer can fill seams at the rate of about twelve feet per minute.

In another broad aspect the invention may be considered to be a device for sealing seams between abutting sheets of flooring. The device of the invention is comprised of a portable, handheld, seam-sealing welding gun, a heat nozzle according to the invention, and a hollow heat welding tip. The heat welding gun has a casing with a longitudinal axis and an elongated, heat-conducting element projecting from the casing along the longitudinal axis. The heat nozzle has a body with an underside and opposing upstream and downstream ends. The terms "upstream" and "downstream", as employed herein, refer to the direction of hot air flow from the rear of the handheld seam welding gun toward the welding tip. An upstream socket is defined within the upstream end of the heat nozzle of the invention. The upstream socket receives the heat-conducting element of the handheld, seam-sealing welding gun therewithin. A downstream socket is defined within the downstream end of the heat nozzle. The upstream and downstream ends of the heat nozzle form an enclosed obtuse angle therebetween at the underside of the body.

At least one preheating jet is formed in the underside of the body. The preheating jet or jets are in communication with the upstream socket and emanate from the underside of the body, between the upstream and downstream ends, within the enclosed obtuse angle defined therebetween. The hollow, heat welding tip has a heating inlet tube that is inserted into the downstream socket of the heat nozzle body. The heat welding tip also has a welding stick receiving tube which terminates in a melting chamber. The welding tip also has an elongated, open mouth with forward and rearward extremities into which and out of which molten sealant from the melting chamber flows.

In still another aspect the invention may be considered to be an improvement in a portable, handheld seam-sealing welding gun for dispensing molten sealant to seal seams between adjacent sheets of flooring. Such a welding gun includes a casing that houses an electrical power source and an air blower. The welding gun also has a heating barrel. A welding tip with a hot air inlet tube is also employed.

The improvement of the invention is comprised of a heat nozzle formed with a body that has an upstream socket that fits over the heating barrel to receive heated air therefrom, and a downstream socket, smaller than the upstream socket and inclined downwardly therefrom to form an obtuse angle relative thereto. At least one preheating jet is formed in the body and is in communication with the upstream socket. The preheating jet or plurality of jets are oriented to direct heated air toward a flooring seam in advance of the welding tip.

The invention may be described with greater clarity and particularity with reference to the accompanying drawings.

DESCRIPTION OF THE EMBODIMENT

Figure 1:
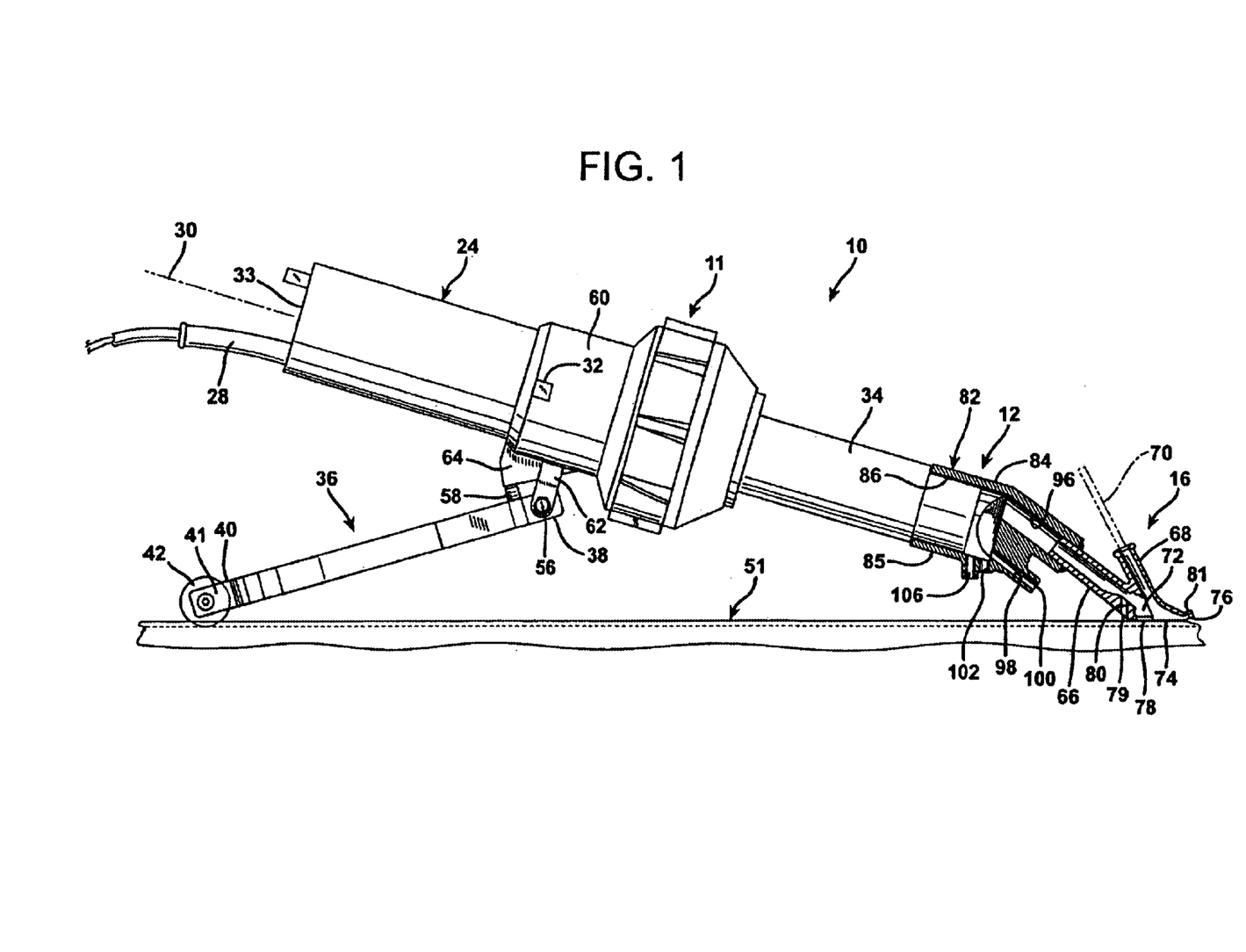
FIG. 1 is a side elevational view, partially broken away and shown in section, illustrating an improved portable, handheld, seam-sealing welding gun according to the invention.

FIG. 1 depicts a device, indicated generally at 10, for sealing seams between adjoining, abutting sheets of flooring 52 and 54 on a flat floor surface 51. The seamsealing device 10 is comprised of a portable, handheld, seam-sealing welding gun 11 equipped with a heat nozzle 14 constructed according to the invention, and also a hollow heat welding tip 16. The heat welding gun 11 is a conventional, Leister Triac model portable, handheld floor seam welding gun. The generally cylindrical casing 24 of the seam welding gun 11 defines a longitudinal axis indicated at 30. The welding gun 11 is powered by commercially available, alternating current through a power supply cord 28. Near its front end the outer casing 24 of the heat welding gun 11 defines a pair of diametrically opposed, radially outwardly projecting lugs 32 having a rectangular configuration, as illustrated.

Heat is produced within the casing 24 by an electrical resistance heating element. A blower within the casing 24 draws air in through the vent openings of a grill located in the circular rear end 33 of the casing 24. The heated air is forced longitudinally, generally along the alignment of the longitudinal axis 30 of the seam welding gun 11 and into a narrower, cylindrical, heat-conducting barrel 34 that projects from the casing 24 along the longitudinal axis 30.

Figure 2:
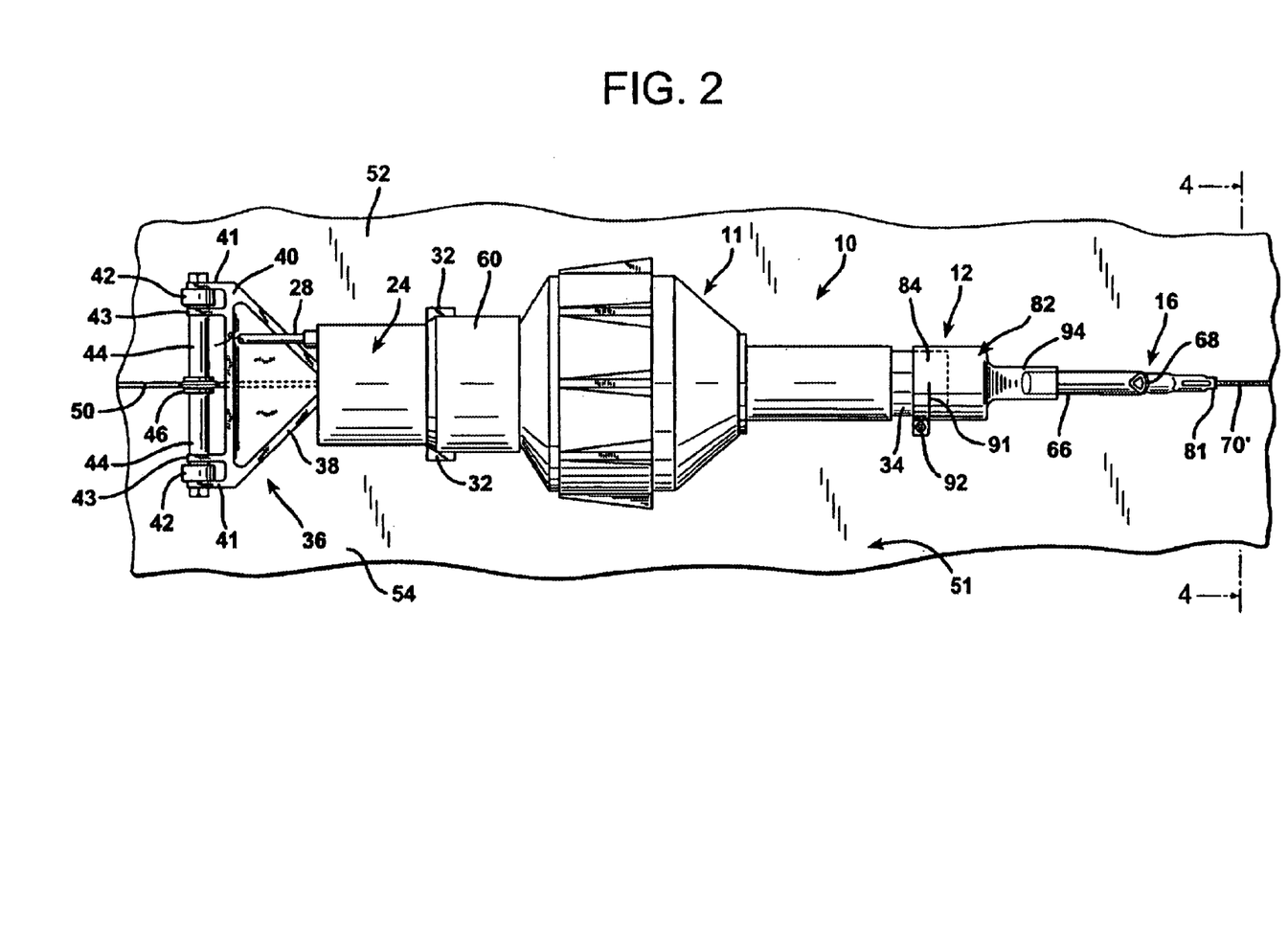
FIG. 2 is a top plan view of the same sealing gun of FIG. 1.

The seam welding gun 11 is supported from beneath by a mobile, stabilizing guide 36 of the type depicted and described in prior U.S. Pat. No. 5,656,126, which is hereby incorporated by reference in its entirety. The stabilizing carriage 36 has a forward end 38 and a rearward end 40. The intermediate portion of the carriage 36 forms a fork that diverges from the forward end 38 to the rearward end 40, as illustrated in FIG. 2. The rearward end 40 of the carriage 36 has two pairs of laterally separated brackets 41, 43 at its outboard extremities that accommodate an axle shaft that extends across the entire width of the rearward end 40. Each of the pairs of laterally separated brackets accommodates a roller 42 mounted for rotation about the axle between brackets 41, 43 in each pair. Between the bracket pairs there is a cylindrical drum 44 mounted upon the axle. A generally disc-shaped track follower 46 is located at the center of the rear end 40 of the carriage 36 between a pair of spacer drums 44. The track follower 46 has a relatively sharp peripheral edge that follows a linear seam 50 defined between two, abutting, adjacent sheets of flooring 52 and 54.

The width of the peripheral edge of the track follower 46 is such that it fits into the channel 50 defined between the abutting edges of the linoleum flooring sheets 52 and 54. The track follower 46 is held laterally centered between the pairs of brackets 41, 43 at the rearward end 40 of the carriage 36 by the spacer drums 44.

The forward end 38 of the carriage 36 is formed as a linear stem or tongue having a transverse aperture therethrough to receive a bolt 56 and an internally tapped bore normal to the plane of the carriage 36 to receive an elevation adjusting set screw 58. The seam-sealing device 10 is further provided with a longitudinally split, cylindrical, annular collar 60, notched out to receive the lugs 32 of the casing 24. At its underside the collar 60 has a pair of radially projecting mounting ears 62 that extend downwardly from the cylindrical portion of the collar 60. The mounting ears 62 are secured to the forward end 38 of the carriage 36 by means of the bolt 56. The collar 60 also includes a downwardly projecting elevation-adjusting flange 64 that is radially aligned with the elevation-adjusting set screw 58. The casing 24 of the welding gun 11 is captured within the collar 60 and held tightly in coaxial alignment therewith by means of the bolt 56 which squeezes the mounting ears 62 toward each other and clamps them against the forward end 38 of the carriage 36.

The welding gun 11 is held at an incline relative to the floor 51 with the longitudinal axis 30 of the welding gun 11 residing at an angle of typically between about five degrees and thirty degrees relative to the horizontal surface of the floor 51. A gross adjustment of the angle of inclination is controlled by loosening the bolt 56 slightly and orienting the angulation of the carriage 36 relative to the casing 24 to approximately the desired angle. The bolt 56 is then tightened. Fine adjustment may be performed by rotating the elevation adjusting set screw 58. The set screw 58 may be advanced toward the adjustment flange 64, thereby increasing the angle of the welding gun 11 relative to the floor 51. Alternatively, counter rotation of the adjustment screw 58 reduces that angle. The tip of the adjustment set screw 58 bears against the underside of the flange 64 to hold the welding gun 11 at a selected angle of inclination relative to the floor 51.

The heat welding tip 16 may be selected from among any number of commercially available heat welding tips for handheld seam welding guns. Preferably, the heat welding tip 16 is either a Turbo round tip 5 mm or a Turbo triangular tip 5.7 mm seam welding tip, depending upon the size and cross-sectional configuration of the sticks 70 of sealant used. These welding tips are sold by Leo Martinez Enterprises and described in considerable detail in U.S. Pat. No. 5,656,126.

Figure 3:
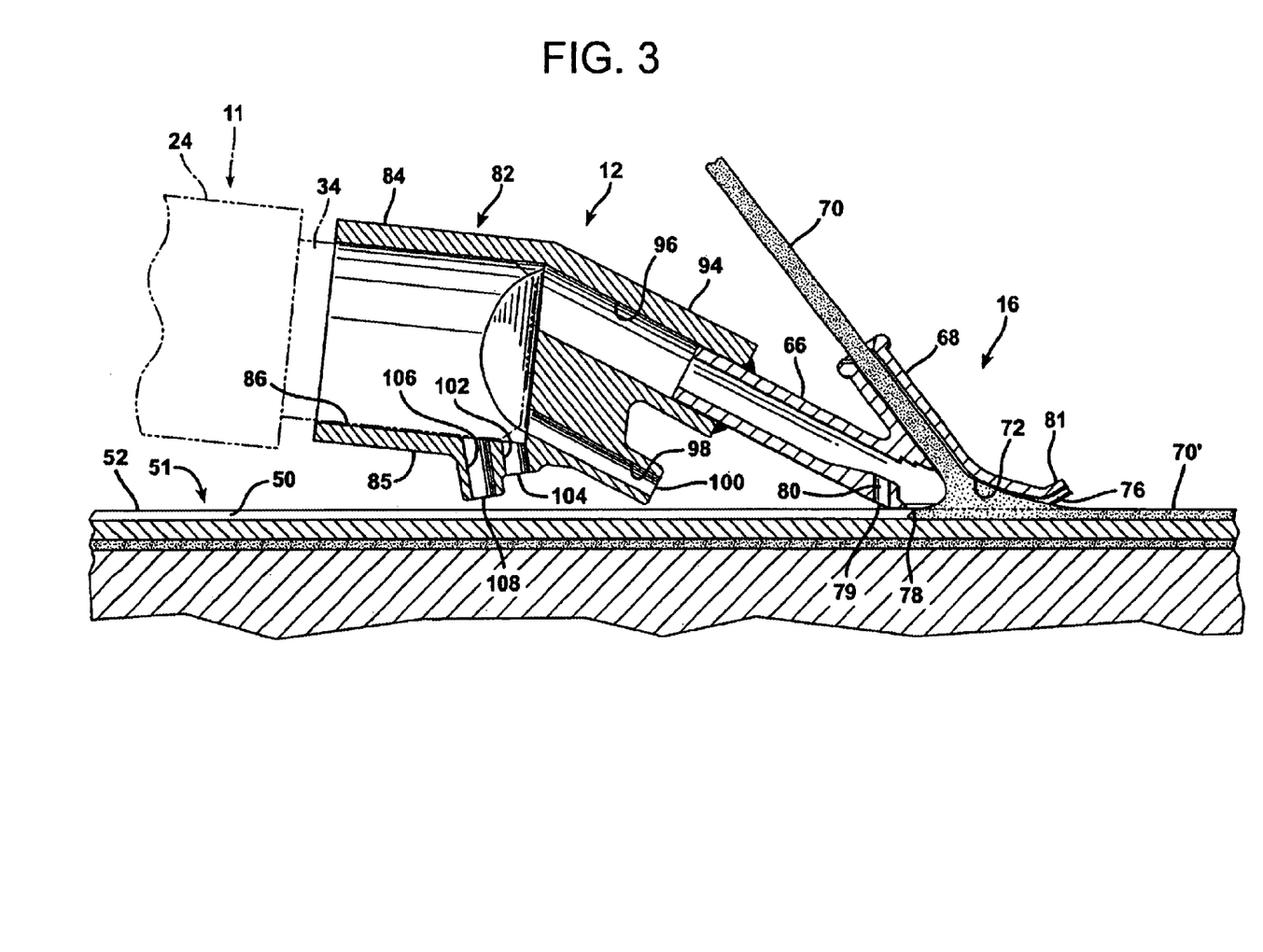
FIG. 3 is a side sectional elevation detail illustrating the nozzle and welding tip together, oriented for use in melting a relative hard sealant.

The heat welding tip 16 has a longitudinally split, cylindrical, annular air inlet tube 66 and a welding rod receiving tube 68 for receiving a 3, 4, or 5 mm welding stick 70, typically formed of vinyl plastic. The air inlet tube 66 and the welding rod receiving tube 68 converge downwardly as illustrated in FIGS. 1 and 3 and intersect at a melting chamber 72 located directly above an elongated, open mouth 74 that has a forward extremity 76 and a rearward extremity 78. The welding tip 16 further defines within its structure a preheating orifice 79 and a separate preheating duct 80 terminating in the orifice 79 that is located behind the rear extremity 78 of the mouth 74. The welding tip 16 also has an upturn toe 81 in front of the forward extremity 76 of the mouth 74.

The novel feature of the invention resides in the construction of the heat nozzle 12. The heat nozzle 12 is molded as a unitary, hollow, cast metal body 82, preferably fabricated of brass, copper, or aluminum. The metal body 82 has a top 83 and an underside 85 and is formed with a cylindrical, annular shaped upstream end 84 that defines a cylindrical socket 86 therewithin. The interior diameter of the socket 86 is selected as appropriate for the particular model of welding gun 11 employed. When utilized with a Leister welding gun, as illustrated in the drawings, the interior diameter of the open end of the socket 86 is preferably about three cm, although the diameter can be varied slightly by compression or expansion of the radially projecting fastening lugs 88 and 90. The fastening lug 90 is internally threaded to receive the threaded end of a clamping screw 92. The fastening lugs 88 and 90 reside on either side of a sheet longitudinally split at the upstream end of the upstream socket 86, and may be moved slightly due to the presence of an arcuate expansion slot 91 in the structure of the body 82, which is visible in FIG. 2. The interior diameter of the socket 86 is just large enough to receive the cylindrical, heat-conducting barrel 34 of the heat welding gun 11. The wall thickness of the socket 86 is preferably about 0.3175 cm.

Figure 5:
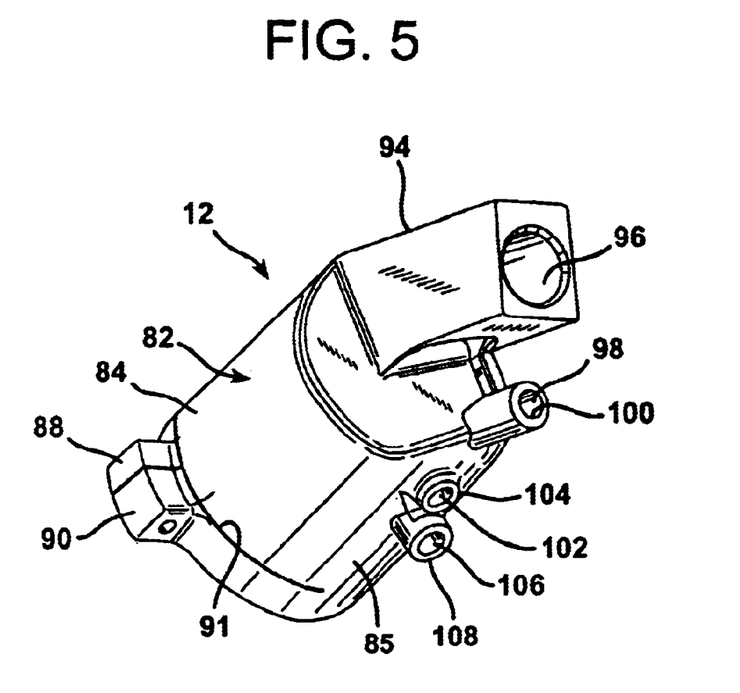
FIG. 5 is a perspective view from the underside illustrating the heat nozzle of the invention in isolation.
Figure 6:
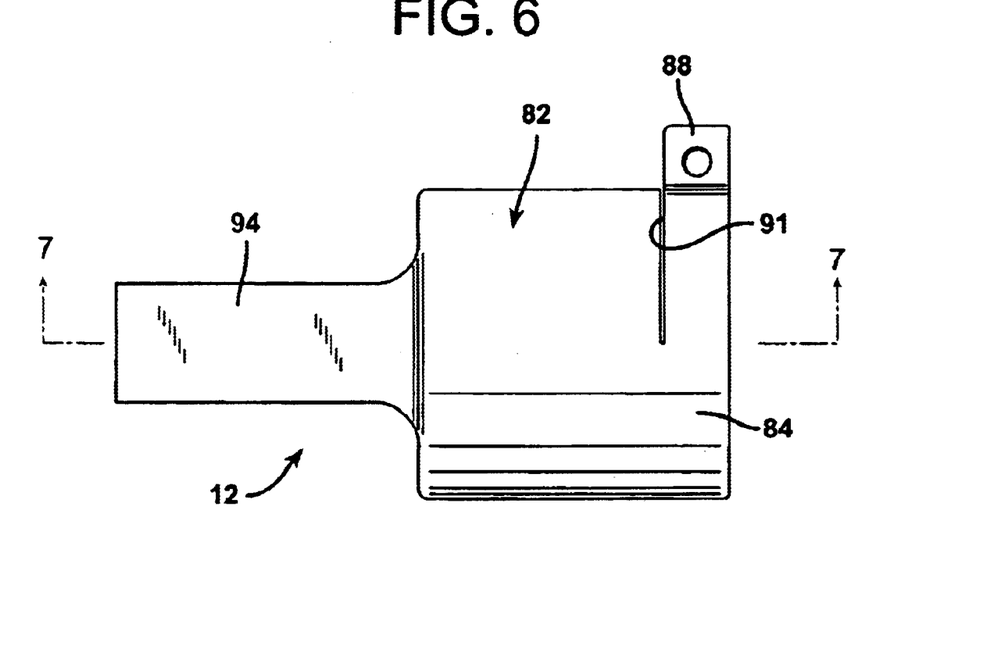
FIG. 6 is a top plan view illustrating the heat nozzle of FIG. 5.
Figure 7:
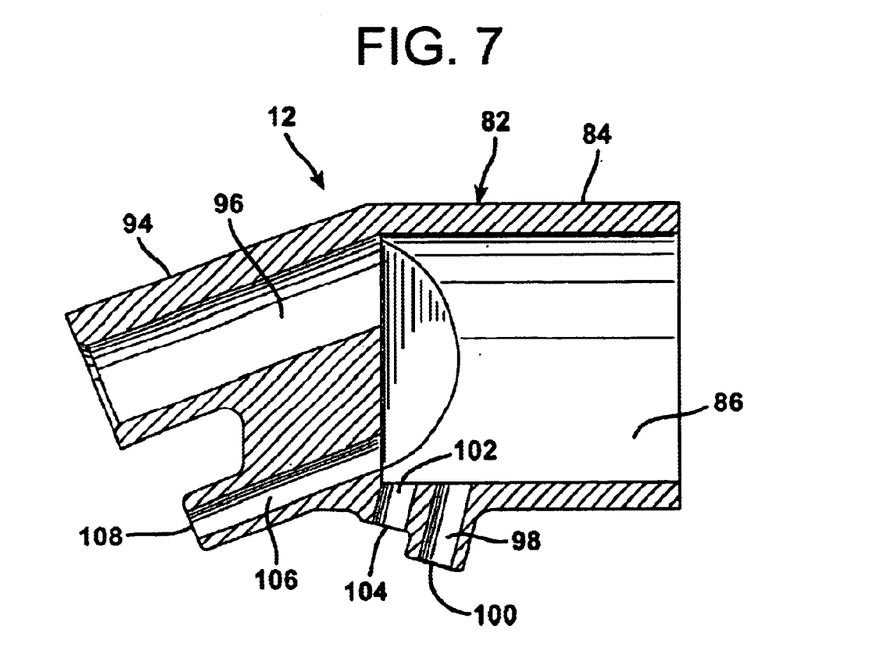
FIG. 7 is a side sectional view, taken along the lines 7—7 of FIG. 6.

The opposite, downstream end 94 of the heat nozzle body 82 has a generally rectangular outer cross-sectional configuration, as illustrated in FIG. 5, preferably about 1.65 cm in height and about 1.33 cm in width. A cylindrical, downstream socket 96 is defined within the downstream end 94 of the body 82 and is preferably about 1 cm in diameter. This is a suitable size to receive within its radial confines the end of the heating air inlet tube 66 of the preferred embodiment of the heat welding tip 16. The heating air inlet tube 66 is inserted into the mouth of the socket 96 and is preferably, permanently secured to the downstream end 94 of the body 82 by welding so that the heat welding tip 16 is always in the proper orientation relative to the heat nozzle 12.

A very important feature of the invention is that there is no obstruction to the cylindrical channel defined in the heating air inlet tube 66 of the welding tip 16. That is, the socket 96 radially surrounds the exterior of the heating air inlet tube 66. In a conventional pencil tip adapter system, a narrow, cylindrical annular mounting and air supply tube of the pencil tip adapter is inserted into the cylindrical opening of the air inlet tube 66. Thus, the portion of the opening of the air inlet tube 66 occupied by the structure of the pencil tip mounting tube is blocked, thus restricting the flow of all the air into the welding tip 16 to the narrow passageway defined within the pencil tip mounting tube. In the present invention the heat welding tip 16 is attached to the welding gun 11 by insertion of the inlet tube 66 into the downstream socket 96, not by insertion of a mounting and air conducting tube into the opening defined within the structure of the air inlet tube 66.

The downstream socket 96 is oriented at an acute angle of between about ten degrees and about thirty degrees from coaxial alignment with the upstream socket 86. Preferably, the sockets 86 and 96 are offset from coaxial alignment by an angle of about twenty degrees relative to each other. The sockets 86 and 96 thereby form an obtuse angle relative to each other of about one hundred sixty degrees.

At least one, and preferably three, preheating jets are formed at the underside 85 of the heat nozzle body 82. These preheating jets lead from the upstream socket 86 to the underside 85 of the body 82.

In the preferred embodiment of the heat nozzle 12 illustrated, a first preheating jet 98 is formed which is oriented parallel to the downstream socket 96. The first preheating jet 98 is preferably spaced about 1.9 cm from the downstream socket 96. The preheating jet 98 is formed as a cylindrical, annular duct or passageway through the structure of the downstream end 94 of the body 82 and is preferably about 2.54 cm in length from its intersection with the upstream socket 86 to its terminus at its outlet port 100. The opening of the first preheating jet 98 is preferably between about 0.45 and about 0.50 cm in diameter.

A second, cylindrical preheating jet 102 is also formed in the underside 85 of the nozzle body 82 upstream from the first preheating jet 98. The second preheating jet 102 is oriented at an acute angle of between about forty and about sixty-six degrees relative to the first preheating jet 98. The second preheating jet 102 is preferably oriented at an angle of about fifty-three degrees relative to the first preheating jet 98. The second preheating jet 102 is also a cylindrical duct or passageway and is about 0.55 cm in length from its intersection with the upstream socket 86 to its outlet port 104. The diameter of the second preheating jet 98 is also between about 0.45 and about 0.50 cm.

A third preheating jet 106 is also formed in the underside 85 of the heat nozzle body 82 and is closely spaced upstream from and parallel to the second preheating jet 102. The third preheating jet 106 is between about 0.9 and about 1 cm in length from its intersection with the upstream socket 86 to its outlet port 108, and is likewise between about 0.45 and about 0.50 cm in diameter. As illustrated, the third preheating jet 106 has a length greater than the length of the second preheating jet 102. The second and shortest preheating jet 102 is located a distance of about 0.635 cm from the third preheating jet 106 and right in front of it. The second preheating jet 102 is located between the first preheating jet 98 and the third preheating jet 106. The three preheating jets 98, 102, and 106 are all in mutual, coplanar alignment with each other, as well as with the centers of both the upstream socket 86 and the downstream socket 96.

To utilize the floor seam sealing device 10 the heat nozzle 12 with the welding tip 16 permanently attached thereto is fastened onto the barrel 34 of the heat welding gun 11. The heat conducting barrel 34 is inserted into the upstream socket 86 with the clamping screw 92 in a slightly loosened condition. The angular orientation of the heat nozzle 12 is adjusted so that the preheating jets 98, 102, and 106 all reside in coplanar relationship with the center of the underside 85 of the casing 24. That is, the body 82 of the heat nozzle 12 is rotationally adjusted on the heat gun barrel 34 until the preheating jets 98, 102, and 106 of the heat nozzle 12 all reside in coplanar relationship with the flange 64. This ensures that the preheating jets 98, 102, and 106 will all be directed straight into the channel 50 defined between the mutually abutting flooring sheets 52 and 54. Once the heat nozzle 12 is in proper angular adjustment relative to the welding gun 11, the clamping screw 92 is tightened.

The flooring installer then determines the proper angle at which the axis 30 of the welding gun casing 24 should reside relative to the floor 51. This angle will typically be between about ten and thirty degrees. The most appropriate angle will be determined in part by the line of sight of the installer over the top of the heat welding gun 11, but another very important factor is the degree of softness or hardness of the welding stick 70, as different plastics utilized as seam welding sticks 70 have somewhat different melting temperatures. If the welding stick 70 is relatively soft, the angle between the axis 30 of the welding gun casing 24 and the floor 51 will be relatively greater, as illustrated in FIG. 1, than if the plastic forming the welding sticks 70 is harder. FIG. 1 illustrates the angle at which the heat welding gun 11 will normally be elevated relative to the floor 51 for a relatively soft plastic sealant stick 70 using the clamping bolt 56 and the height adjusting set screw 58.

A greater amount of heat should be supplied when using a relatively high melting temperature welding stick 70. This is necessary to adequately raise the temperature at the portion of the channel 50 just to the rear of the welding tip 16. Therefore, the angle of orientation of the alignment of the welding gun casing 24, and therefore the heat nozzle 12 as well, will be reduced, as illustrated in FIG. 3. The ports 100, 104, and 108 of the preheating jets 98, 102, and 106, respectively, should be just far enough above the channel 50 so that the molten material from the seam welding sticks 70 flows smoothly into the channel 50 as it is melted in the melting chamber 72. Care should be exercised so that the temperature in the channel 50 is not so great as to lower the viscosity of the molten sealant so much that it flows onto the surfaces of the linoleum sheets 52 and 54 on either side of the channel 50.

With the angulation of the entire device 10 adjusted relative to the floor 51 by means of the bolt 56 and height adjusting set screw 58, the heat welding gun 11 is turned on and the welding stick 70 is inserted into the welding rod receiving tube 68. The upturned toe 81 of the welding tip 16 is positioned at the start or forward end of the channel 50. The track follower 46 is positioned in the channel 50 with the rollers 42 in contact with the sheets of flooring 52 and 54. The flooring installer then pulls the heat welding device 10 rearwardly, to the left as viewed in FIGS. 1 and 2, pulling the track follower 46 along the channel 50. The heat welding gun 11 draws ambient air in through the grill at the rear end 33 of the casing 24. The air is heated within the casing 24, and forced by an internal blower through the heating barrel 34 into the heat nozzle 12.

The main portion of the heated air flows from the upstream socket 86 into the downstream socket 96 and into the cylindrical opening of the air inlet tube 66 of the heating tip 16. The seam sealant stick 70 is then melted in the melting chamber 72 with a certain amount of preheating provided by the preheating duct 80 within the heating tip 16, as described in U.S. Pat. No. 5,656,126. In addition, the portion of the channel 50 immediately behind the mouth 74 of the heating tip 16 is preheated by a portion of the air from the upstream socket 86 that flows into the preheating jets 98, 102, and 106 and out of the ports 100, 104, and 108, respectively. Air is ejected from the downstream socket 96 and from the preheating jets 98, 102, and 106 at a temperature of about three hundred fifteen degrees Centigrade.

Figure 4:
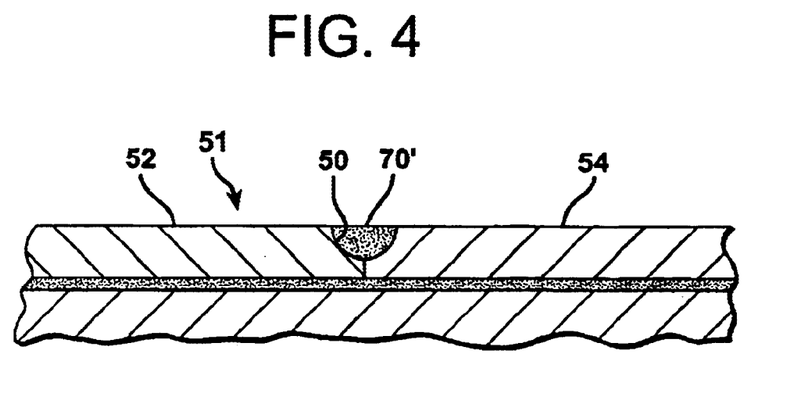
FIG. 4 is a transverse sectional detail taken along the lines 4—4 of FIG. 2, illustrating a seam sealed utilizing the welding gun of FIG. 1.

Due to the preheating effect provided by the preheating jets 98, 102, and 106 of the heat nozzle 12, and due to the increased volume of heated air that is provided to the heating tip 16 through the heating air intake tube 66, as contrasted with a conventional pencil tip adapter, the channel 50 can be filled with molten sealant, indicated at 70' in FIG. 4, much more rapidly than has heretofore been possible with handheld seam sealant welding guns. Utilizing the seam sealing device 10 illustrated in FIGS. 1 and 2, the channel 50 can be filled at a rate of twelve feet per minute, as contrasted to the much slower rate of about four feet per minute typical of conventional portable, handheld seam sealing gun systems. Quality workmanship in sealing seams between sheets of flooring at the speed achieved using the present invention has not previously been obtainable using portable, manual seam welding guns.

Undoubtedly, numerous variations and modifications of the invention will become readily apparent to those familiar with floor covering seam sealing systems. For example, while the welding gun 11 illustrated in the drawings is a Leister Triac is welding gun, any other commercially available welding gun, including all other Leister models and all Zinser models, may be utilized in accordance with the present invention. Also, although the preferred welding tip 16 employed is a Turbo triangular or round tip, any other commercially available welding tip having a heating air inlet tube may be utilized to advantage with the heat nozzle of the invention. Accordingly, the scope of the invention should not be construed as limited to the specific embodiment depicted and described, but rather is defined in the claims appended hereto.

What is claimed is:

1. A heat nozzle for a handheld flooring seam sealing device comprising: an enclosing body having a top side and an underside and defining therewithin an upstream end forming an upstream socket for receiving therewithin a heat conducting barrel of a handheld floor seam welding gun and a downstream end, a heat welding tip located at said downstream end of said body, said heat welding tip having a mouth opening and a heating air inlet tube leading to said mouth opening, and said heating air inlet tube is oriented at an acute angle of between about ten degrees and about thirty degrees from coaxial alignment with said upstream socket, so that said upstream socket and said heating air inlet tube form an obtuse angle in said body, and at least one preheating jet is formed in said body extending therethrough from upstream of said heating air inlet tube to said underside of said body.

2. A heat nozzle according to claim 1 further comprising a plurality of preheating jets as aforesaid, and a first of said jets is oriented parallel to said heating air inlet tube, and said plurality of preheating jets and said heating air inlet tube are all aligned in coplanar relationship.

3. A heat nozzle according to claim 1 wherein a second of said preheating jets is positioned upstream from said first jet and is oriented at an acute angle relative thereto of from between about forty and about sixty-six degrees.

4. A heat nozzle according to claim 3 wherein said second preheating jet is oriented at an angle of about fifty-three degrees relative to said first preheating jet.

5. A heat nozzle according to claim 3 wherein a third of said preheating jets is positioned upstream from both said first and second jets and is oriented parallel to said second preheating jet.

6. A heat nozzle according to claim 5 wherein said first preheating jet is formed of a cylindrical duct about 2.54 cm in length and between about 0.45 and about 0.50 cm in diameter.

7. A heat nozzle according to claim 5 wherein said second preheating jet is formed of a cylindrical duct about 0.55 cm in length and between about 0.45 and about 0.5 cm in diameter.

8. A heat nozzle according to claim 5 wherein said third preheating jet is formed of a cylindrical duct between about 0.9 and about 1 cm in length and between about 0.45 and about 0.50 cm in diameter.

9. A heat nozzle according to claim 1 wherein said upstream socket and said heating air inlet tube are offset from coaxial alignment at an angle of about twenty degrees relative to each other.

10. A device for sealing seams between abutting sheets of flooring comprising:

a portable, handheld seam sealing welding gun having a casing with a longitudinal axis and an elongated heat conducting element projecting from said casing along said longitudinal axis, a heat nozzle having a body with an underside and having opposing upstream and downstream ends, and defining within said upstream end an upstream socket that receives said heat conducting element therewithin, and a hollow, heat welding tip with a heating air inlet tube leading thereto located at said downstream end of said heat nozzle body, and said heat welding tip defines within its structure a welding stick receiving tube which terminates in a melting chamber above an elongated, open mouth with forward and rearward extremities, and said upstream socket and said heating air inlet tube form an enclosed obtuse angle therebetween at said underside of said body, and at least one preheating jet is formed in said underside of said body in communication with said upstream end thereof upstream from said heating air inlet tube and emanating from said underside of said body between said upstream end of said body and said tip within said enclosed obtuse angle.

11. A device according to claim 10 wherein said enclosed obtuse angle is about one hundred sixty degrees.

12. A device according to claim 11 further characterized in that said heat nozzle has a plurality of preheating jets as aforesaid, a first of which is aligned parallel to said heating air inlet tube and a second of which is oriented at an angle of between about forty and about sixty-six degrees.

13. A device according to claim 12 further comprising a third preheating jet parallel to said second preheating jet.

14. A device according to claim 10 wherein said hollow heat welding tip has an upturned toe in front of said forward extremity of said mouth and a separate duct in communication with said melting chamber and terminating in an orifice located behind said rear extremity of said mouth.

15. A device according to claim 10 further comprising a supporting, stabilizing carriage disposed beneath said welding gun to support said casing at an angle of between about ten and about thirty degrees of inclination of relative to said sheets of flooring.

16. In a portable, handheld seam sealing welding gun for dispensing molten sealant to seal seams between adjacent sheets of flooring, and including a casing housing an electrical power source and an air blower and having a heating barrel, a heat nozzle formed with a body that has an upstream end with a socket that fits over said heating barrel to receive heated air therefrom and a downstream end equipped with a hollow, heat welding tip having a melting chamber with a downwardly opening sealant dispensing mouth having forward and rearward extremities, a heating air inlet tube leading to said melting chamber, and said heating air inlet tube has an upper end at said downstream end of said body and a lower end terminating at said melting chamber, and said heating air inlet tube is inclined downwardly from said upstrean socket to form an obtuse angle relative thereto and receives hot air therethrough and delivers said hot air to said melting chamber, and said hollow, heat welding tip is also provided with a preheating duct leading from said lower end of said heating air inlet tube to a preheating orifice located in said heat welding tip behind said rear extremity of said sealant dispensing mouth, the improvement comprising at least one preheating jet formed in said body and which receives hot air upstream from said preheating duct, and said at least one preheating jet is oriented to direct heated air toward a flooring seam behind said orifice and in advance of said heat welding tip.

17. A welding gun according to claim 16 wherein said heat nozzle includes a first of said preheating jets oriented parallel to said heating air inlet tube, and a second of said preheating jets oriented at an angle of about fifty-three degrees relative to said first preheating jet.

18. A welding gun according to claim 17 further comprising a third preheating jet located parallel to said second preheating jet and having a length greater than the length of said second preheating jet, and said second preheating jet si located between said first and third preheating jets.

\* \* \* \* \*